(12) United States Patent
Harrington et al.

(10) Patent No.: US 10,862,578 B2
(45) Date of Patent: Dec. 8, 2020

(54) POWER SUPPLY WITH INTEGRATED MOCA AND POWER OVER ETHERNET (POE)

(71) Applicant: HUGHES NETWORK SYSTEMS, LLC, Germantown, MD (US)

(72) Inventors: Emanuel Harrington, Germantown, MD (US); Raymond Helfrich, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 21 days.

(21) Appl. No.: 16/236,934

(22) Filed: Dec. 31, 2018

(65) Prior Publication Data

US 2020/0212997 A1    Jul. 2, 2020

(51) Int. Cl.
*H04B 7/185* (2006.01)
*H04L 12/10* (2006.01)
*H01Q 1/00* (2006.01)
*H01Q 1/24* (2006.01)

(52) U.S. Cl.
CPC ......... *H04B 7/18517* (2013.01); *H01Q 1/007* (2013.01); *H04B 7/1858* (2013.01); *H04L 12/10* (2013.01); *H01Q 1/247* (2013.01)

(58) Field of Classification Search
CPC ... H04B 7/18517; H04B 7/1858; H04L 12/10; H01Q 1/007; H01Q 1/247
USPC .......................................................... 370/316
See application file for complete search history.

(56) References Cited

U.S. PATENT DOCUMENTS

| | | | |
|---|---|---|---|
| 2008/0130640 A1* | 6/2008 | Hurwitz | H04B 3/54 370/389 |
| 2013/0201316 A1* | 8/2013 | Binder | H04L 67/12 348/77 |
| 2015/0078756 A1* | 3/2015 | Soto | H04B 10/808 398/116 |
| 2017/0170873 A1* | 6/2017 | Palayur | H04L 12/2801 |
| 2018/0152308 A1* | 5/2018 | Francisco | H04L 12/2803 |
| 2020/0030184 A1* | 1/2020 | Sikora | A61H 33/005 |

\* cited by examiner

*Primary Examiner* — Faisal Choudhury
(74) *Attorney, Agent, or Firm* — Jones Robb, PLLC

(57) ABSTRACT

An apparatus and system for supplying power to different devices at different levels. The apparatus includes an input port for receiving power from an external source. A first converter is provided for converting the input power to a first DC voltage, and a second converter for converting the input power to a second DC voltage. Ethernet ports are provided for supplying, at least in part, the first DC voltage to a first type of device. MoCA ports are provided for supplying, at least in part, the second DC voltage to a second type of device.

9 Claims, 3 Drawing Sheets

POWER SUPPLY WITH INTEGRATED MOCA AND POWER OVER ETHERNET (POE)

BACKGROUND INFORMATION

Consumers are continually increasing their use of technological devices. Smart devices and appliances are often found throughout many homes. Consumers often own, for example, personal devices such as smartphones, tablets, and laptops. In addition, consumers will often incorporate an internet of things (IoT) that include televisions, home assistants, thermostats, refrigerators, ovens, etc. Many consumers also subscribe to service from content providers, (e.g., cable, satellite, video/audio streaming) which deliver live programming and/or on-demand programming. All of these technological devices require connections to local (home) or external networks (internet). Wireless network connections have emerged as a very popular means for connecting personal and home devices.

Television and internet services are typically delivered to a residence using various types of standard wiring as the physical media. In the case of satellite services, an external dish (i.e., antenna) is used to receive signals from a satellite and wires/cables are used to direct the received signals inside the residence. The wires often enter via a basement area that may not be "finished" and lack sufficient electrical outlets to power modems and routers in addition to essential devices such as sump pumps, furnaces, etc. Consequently, consumers will utilize extension cords and/or power strips to increase the number of available outlets. The use of too many, or underrated, extension cords can sometimes result in hazardous conditions.

Power over Ethernet (PoE) has recently provided an ability to simultaneously supply power and data to certain networking devices using a common ethernet cable. Thus, networking devices such as routers, switches, cameras, etc. can be operated without the need for a separate power supply. Consumers utilizing satellite-based service often have a very small aperture terminal (VSAT) with an outdoor antenna (i.e., dish) unit. Certain satellite systems have IPRadio configurations in which the modem circuitry traditionally found in the indoor unit, is incorporated into the outdoor unit together with the traditional radio circuitry. The IPRadio, however, requires power from an indoor unit that is also located in the basement portion where other cables enter the residence. This further increases the need for additional power outlets without increasing the risk of potential connection hazards.

Based on the foregoing, there is a need for an apparatus capable of supplying power to both an IPRadio and network devices.

BRIEF SUMMARY

An apparatus and system are disclosed for supplying power at different levels. According to an embodiment, the apparatus includes: an input port for receiving an input voltage from an external source; a first converter for converting the input voltage to a first DC voltage; a second converter for converting the input voltage to a second DC voltage; one or more ethernet port for supplying, at least in part, the first DC voltage; and at least one multimedia over coax alliance (MoCA) ports for supplying, at least in part, the second DC voltage, wherein the first DC voltage is lower than the second DC voltage.

According to another embodiment, the system includes: a satellite terminal configured, at least in part, to facilitate communication by one or more user equipment via a satellite, the indoor unit being positioned at an indoor location; a satellite antenna unit positioned at an outdoor location, the satellite antenna unit incorporating an IPRadio; and a power supply unit disposed within the indoor unit, the power supply unit comprising: an input port for receiving an input voltage from an external source, a first converter for converting the input voltage to a first DC voltage, and a second converter for converting the input voltage to a second DC voltage. The system further includes: at least one ethernet port disposed in the indoor unit for supplying, at least in part, the first DC voltage to an indoor source; one or more multimedia over coax alliance (MoCA) ports disposed in the indoor unit for supplying, at least in part, the second DC voltage to the satellite antenna unit; and an interfacility link (IFL) cable for connecting the indoor unit to the satellite antenna unit via one of the one or more MoCA ports, wherein the IFL cable supplies the second DC voltage to the IPRadio and supplies data to/from the IPRadio, and wherein the at least one ethernet port and the one or more MoCA ports are accessible from a panel of the receiver unit.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus and system for supplying power at different levels are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
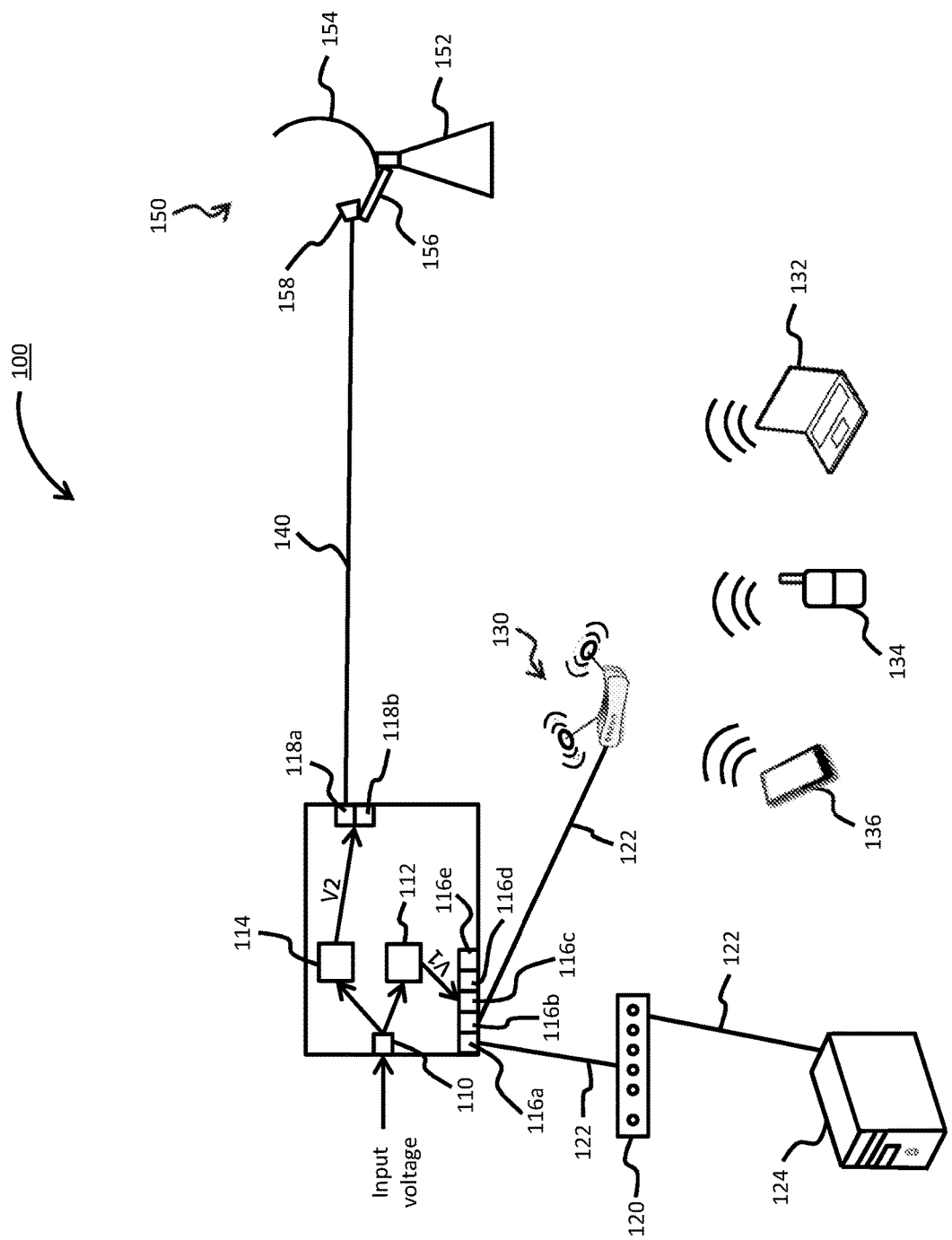
FIG. 1 illustrates a power supply unit in accordance with one embodiment.

FIG. 1 illustrates a power supply unit 100 capable of powering different types of devices, in accordance with one or more embodiments. The power supply unit 100 includes an input port 110 for receiving an input voltage from an external source. Depending on the specific implementation, the input port 110 can receive the input voltage in different formats. According to at least one embodiment, for example, the input voltage can be in the form of alternating current (AC) from a conventional power outlet. According to other embodiments, the input voltage can be in the form of direct current (DC). Thus, the input voltage can be received directly from a power cable adapted to interface (e.g., connect) with a power outlet to receive AC voltage. An AC/DC converter can optionally be used, however, to convert the AC voltage from the power outlet into DC voltage prior to reaching the input port 110.

According to one or more embodiments, the power supply unit 100 can be configured to convert the input voltage into multiple DC outputs that are different from each other. The power supply unit 100 can include, for example, hardware and circuitry for converting either AC or DC input voltages into different DC voltages appropriate for devices that may require power from the power supply unit 100. As illustrated in FIG. 1, the power supply unit 100 can include a first converter 112 configured to convert the received input voltage into a first DC voltage (V1) having predetermined properties such as voltage and current ratings. If an AC/DC converter is used to convert the input voltage from AC to DC, the first converter 112 can be configured to adjust only the properties of the received input voltage.

The power supply unit 100 also includes a second converter 114 that is configured to convert the received input voltage into a second DC voltage (V2) having predetermined properties. The second converter 114 can also be configured to simply adjust the properties of the received input voltage, if an AC/DC converter is used to supply the input voltage in DC form. While FIG. 1 illustrates two converters (112, 114), it should be noted that other embodiments can include additional converters as required by the specific application. The power supply unit 100 can also be configured to include only one converter.

According to at least one embodiment, the power supply unit 100 can include a plurality of ethernet ports 116a, 116b, 116c, 116d, 116e (collectively 116) having standard RJ-45 connection architecture. The ethernet ports 116 can be configured to receive the first DC voltage from the first converter 112, and supply the first DC voltage to external devices. Depending on the specific implementation, the first DC voltage can be supplied at only one ethernet port (e.g., ethernet port 116a), or at multiple ethernet ports 116. The power supply unit 100 can also include one or more multimedia over coax alliance (MoCA) ports 118a, 118b (collectively 118). The ethernet ports 116 and the MoCA ports 118 can be configured to supply DC power at different voltage levels (e.g., V1 and V2), thereby allowing them to supply power for different applications. For example, conventional network devices such as routers and switches typically operate using 5V to 12V from a DC source. Thus, first converter 112 can be configured to supply the first DC voltage to the ethernet ports 116 at an appropriate level (e.g., 5V) for specific supported network devices.

According to at least one embodiment, the ethernet ports 116 can be used to supply power and data to the network devices using power over ethernet (PoE) specifications. The first converter 112 can therefore be further configured to supply the first DC voltage in accordance with various PoE classes. Depending on the specific implementation for powering network devices, the first converter 112 can be configured to output power to the ethernet ports 116 in accordance with PoE class 0, class 1, class 2, class 3, or class 4.

As illustrated in FIG. 1, a network router or switch 120 can be connected to the first ethernet port 116a. A network cable 122 such as a category 5 (CAT-5), category 6 (CAT-6), etc. can be used to supply power and data to the router 120. Thus, if the router 120 must be placed in a location with few, or one, power outlet, a single power outlet could be used to operate both the power supply unit 100 and the router 120. More particularly, depending on the specific application, the ethernet ports 116 can also carry network traffic that could be simultaneously transmitted with the power. According to various embodiments, the router 120 can be subsequently interfaced with various user devices. For example, a network cable 122 can also be used to connect a user device such as a personal computer 124 to the router 120.

As previously discussed, multiple routers 120 and/or network devices (e.g., IP camera and surveillance devices) can be simultaneously connected to the ethernet ports 116. As further illustrated in FIG. 1, a network device such as a wireless router 130 can be connected to ethernet port 116b via a network cable 122. The wireless router 130 could also receive both power and data via the network cable 122. Various additional user devices can subsequently establish connections to the wireless router 130. For example, a laptop 132, a mobile phone 134, and a tablet 136 can be configured to establish wireless connections to the wireless router 130. Depending on the specific implementation for the power supply unit 100, all five of the ethernet ports 116a-116e shown in FIG. 1 can be configured to simultaneously supply power and data to various network devices. It is also possible, however, to only have a portion of the available ethernet ports (e.g., 116a and 116b) configured to supply both power and data, while the remaining ethernet ports (116c, 116d, 116e) only supply data.

According to the illustrated embodiment, the power supply unit 100 also includes multiple MoCA ports 118a, 118b. The MoCA ports 118 can be used, for example, to establish a connection to different devices which operate at a different voltage from the network devices. According to at least one embodiment, an outdoor unit 150 of a satellite terminal can be connected to one of the MoCA ports 118a using an interfacility links (IFL) cable 140. The IFL cable 140 can be in the form of a coaxial cable capable of carrying DC power and digital data signals. According to at least one embodiment, the satellite terminal can be in the form of a very small aperture terminal (VSAT) that includes an outdoor unit 150 and an indoor unit. Other embodiments, however, provide for all components of the VSAT to be located within the outdoor unit 150, thereby eliminating the need for a separate indoor unit.

According to an embodiment, the outdoor unit 150 can be a satellite antenna unit for the VSAT. The outdoor unit 150 can include, for example, a base 152 that is used for mounting an antenna dish 154. The outdoor unit 150 further includes a feed arm 156, and a transceiver 158 such as an IPRadio mounted on the feed arm 156. Depending on the specific implementation, the outdoor unit 150 can include a modulator, demodulator, processing unit, etc. Additionally, one or more components of the outdoor unit 150 can be implemented on various types of computing or processing devices such as: single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such processing devices may be contained on a single unitary IC die, or distributed across multiple components. For example, one or more components may be contained within the indoor unit of the VSAT. The IFL cable 140 includes a first end connected to MoCA port 118a and a second end connected to the IPRadio 158 via a matching MoCA port. Depending on the specific configuration, a low noise block downconverter (LNB) can be incorporated within the IPRadio 158 mounted on the feed arm 156 in order to facilitate receiving and amplifying outroute signals received from the satellite. Other configurations can provide for a separate transmitter and LNB mounted on the feed arm 156. A coupler/splitter could subsequently be used to combine/split the second end of the IFL cable 140 to facilitate connections with both the transmitter and the LNB.

According to at least one embodiment, MoCA port 118 can be configured to receive, and subsequently supply, a DC voltage ranging from 24V to 48V. Accordingly, the second converter 114 can be configured to convert the input voltage to an appropriate DC voltage (e.g., 48V). The MoCA ports 118 can also be configured to facilitate data transfer to/from the IPRadio 158. The IFL cable 140 could, therefore, be used to supply power to the IPRadio radio 158 while also facilitating data transfer. The power supply unit 100 can be further configured to support a second outdoor unit via MoCA port 118b in embodiments that support two outdoor units 150. While FIG. 1 illustrates only 2 MoCA ports, it should be noted that additional MoCA ports can also be incorporated within the power supply unit 100.

Figure 2:
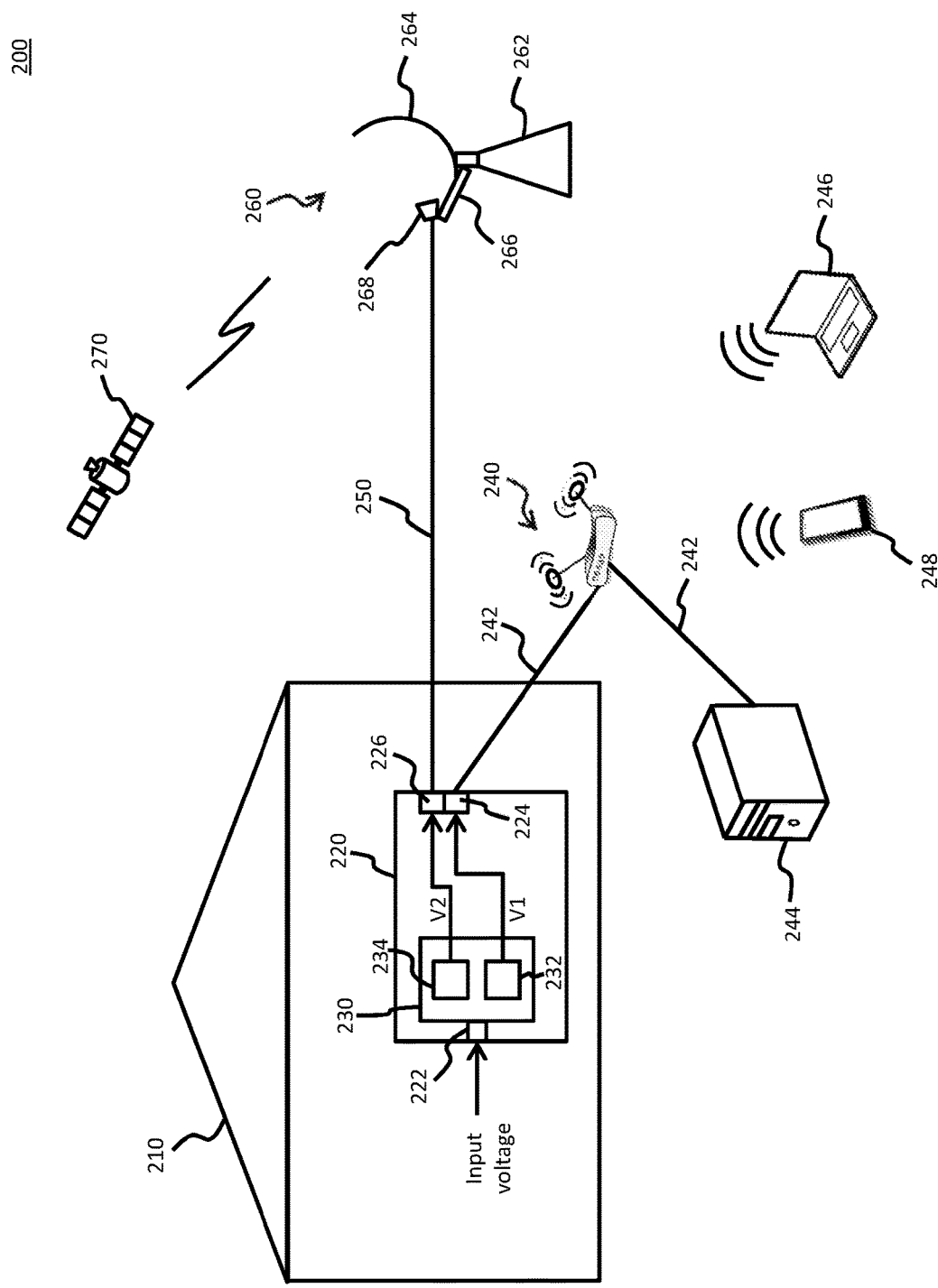
FIG. 2 illustrates a system for supplying different power levels, according to one embodiment.

FIG. 2 illustrates a system 200 for supplying different levels of power to different types of devices, in accordance with one or more embodiments. The system 200 includes a satellite terminal (e.g., VSAT) associated with a dwelling 210, such as a home or office, in order to provide voice and data services to customers. According to the embodiment illustrated in FIG. 2, the satellite terminal can include an indoor unit 220, and an outdoor unit 260 for transmitting/receiving data to/from a communication satellite 270. The indoor unit 220 can be in the form of various components including, for example, a satellite receiver for television programming, a satellite modem for facilitating voice and data services, etc.

According to at least one embodiment, the indoor unit 220 includes an input port 222 for receiving an input voltage from a power source within the dwelling 210. For example, the input voltage can be received from a conventional AC power outlet within the dwelling 210 which outputs 120V. Depending on the specific implementation, however, an AC/DC converter can also be used to convert the AC voltage from the power outlet into DC voltage prior to the input port 222. The indoor unit 220 also includes a power supply unit 230 configured to convert the input voltage into different DC voltages. According to the illustrated embodiment, the power supply unit 230 includes a first converter 232 configured to convert the received input voltage into a first DC voltage (V1) having predetermined voltage and current ratings. If an AC/DC converter is incorporated to convert the input voltage from AC to DC, the first converter 232 can be configured to adjust only properties (e.g., current and voltage levels) of the resulting DC voltage. The power supply unit 230 also includes a second converter 234 configured to convert the received input voltage into a second DC voltage (V2) having predetermined properties. The second converter 234 can also be configured to simply adjust properties of the received input voltage, if an AC/DC converter is used to convert the AC voltage from the power outlet.

According to various embodiments, the indoor unit 220 can include an ethernet port 224 having standard RJ-45 connection architecture. The ethernet port 224 can be provided on a panel of the indoor unit 220 to facilitate access without the need for disassembly. The ethernet port 224 is configured to receive the first DC voltage from the first converter 232 and supply the first DC voltage to an external network device using PoE specifications. For example, the first converter 232 can output the first DC voltage to the ethernet port 224 in accordance with standards for PoE class 0, class 1, class 2, class 3, or class 4. A network device such as a wireless router or switch 240 can be connected to the ethernet port 224 using a network cable 242 (e.g., CAT-5, CAT-6, etc.) to supply both power and data. According to such embodiments, if the wireless router 240 must be placed in a location with a limited number of power outlets, a single power outlet could be used to operate both the indoor unit 220 and the wireless router 240. As illustrated in FIG. 2, the wireless router 240 can be used to establish connections with various user devices. For example, a network cable 242 can also be used to connect a personal computer 244 to the wireless router 240. Additionally, a laptop 246 and a tablet 248 can establish wireless connections to the wireless router 240.

The indoor unit 220 illustrated in FIG. 2 also includes a MoCA port 226 which receives the second DC voltage from the second converter 234. Similar to the ethernet port 224, the MoCA port 226 can be accessed via a panel of the indoor unit 220. The MoCA port 226 can be used to establish a connection to different devices which operates at a different voltage from the wireless router 240. According to one or more embodiments, the outdoor unit 260 connects to the MoCA port 226 of the indoor unit 220 using an interfacility links (IFL) cable 250. The outdoor unit 260 can include, for example, a base 262 for mounting an antenna dish 264. The outdoor unit 260 also includes a feed arm 266 which extends from the base 262. A transceiver such as an IPRadio 268 is subsequently mounted at the end of the feed arm 266 and facing the antenna dish 264.

The IPRadio 268 can be configured to incorporate a receiver unit such as an LNB and a transmitter unit. The receiver unit would receive and amplify outroute signals received from the satellite 270. The receiver unit also down-converts the Ku, Ka, or C-band frequency signals used by the satellite to L-band frequency signals appropriate for transmission over the IFL cable 250. The transmitter unit receives L-band signals from the indoor unit 220 and up-converts them to Ku-band signals for transmission to the satellite 270. Various embodiments, however, can include an IPRadio 268 configured only to perform transmit functions, and a separate LNB to perform receive functions.

According to an embodiment, the IFL cable 250 connects directly to a MoCA port 226 of the IPRadio 268 for supplying power required for normal transmit and receive operations. Depending on the specific application, the MoCA port 226 can be configured to receive, and subsequently supply, a DC voltage ranging from 24V to 48V to the IPRadio 268. The MoCA port 226 can also be configured to facilitate data transfer to/from the IPRadio 268. Accordingly, the IFL cable 250 can be used to supply power to, and facilitate data transfer with, the IPRadio 268. Embodiments incorporating a separate LNB can further include a coupler/splitter connected to one end of the IFL cable 250 to establish a connection with the IPRadio 268 as well as the LNB.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described indoor unit, outdoor unit, IPRadio, receivers, transmitters, transceivers, etc. Additionally, such hardware can be interfaced to connect and/or facilitate communication between different components such as the indoor unit and the outdoor unit.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 3:
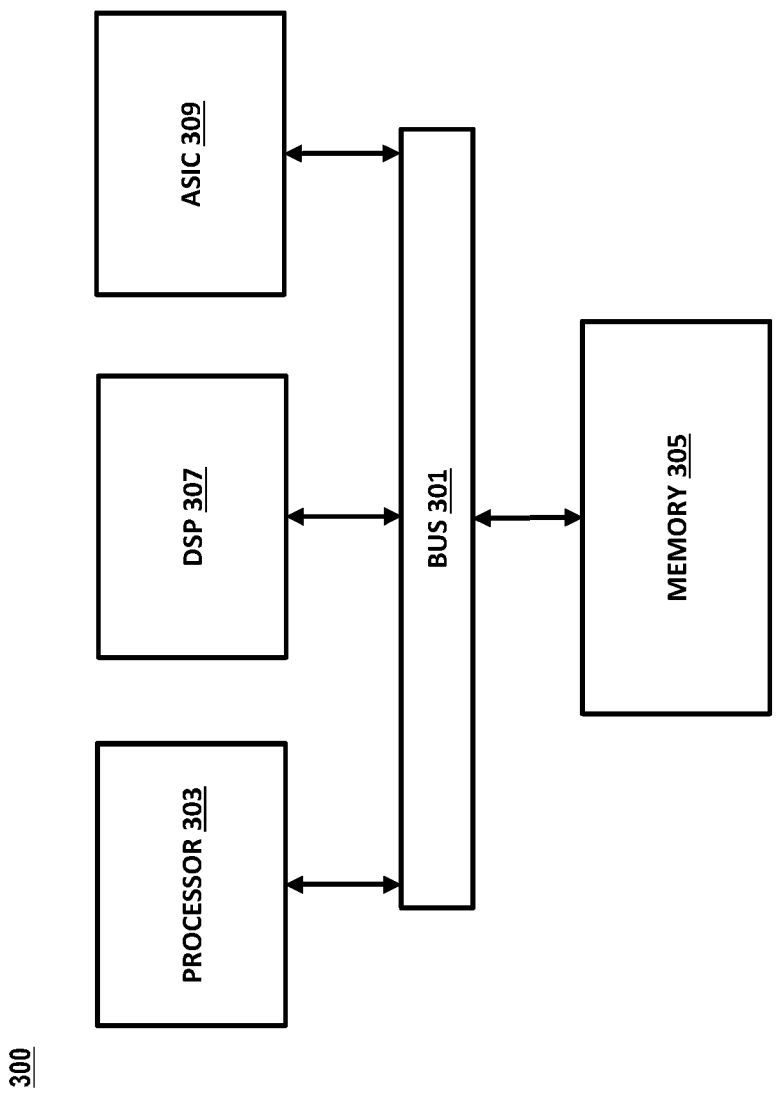
FIG. 3 is a diagram of a chip set that can be used to implement various exemplary features and embodiments.

FIG. 3 illustrates a chip set 300 upon which features of various embodiments may be implemented. Chip set 300 is programmed to implement various features as described herein and includes, for instance, the processor and memory components described with respect to FIG. 3 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 300, or a portion thereof, constitutes a means for performing one or more steps of the figures.

In one embodiment, the chip set 300 includes a communication mechanism such as a bus 301 for passing information among the components of the chip set 300. A processor 303 has connectivity to the bus 301 to execute instructions and process information stored in, for example, a memory 305. The processor 303 may include one or more processing cores with each core configured to perform independently. A multi-core processor enables multiprocessing within a single physical package. Examples of a multi-core processor include two, four, eight, or greater numbers of processing cores. Alternatively or in addition, the processor 303 may include one or more microprocessors configured in tandem via the bus 301 to enable independent execution of instructions, pipelining, and multithreading. The processor 303 may also be accompanied with one or more specialized components to perform certain processing functions and tasks such as one or more digital signal processors (DSP) 307, or one or more application-specific integrated circuits (ASIC) 309. A DSP 307 typically is configured to process real-world signals (e.g., sound) in real time independently of the processor 303. Similarly, an ASIC 309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. An apparatus comprising:
   an input port for receiving an input voltage from an external source;
   a first converter for converting the input voltage to a first DC voltage;
   a second converter for converting the input voltage to a second DC voltage;
   one or more ethernet ports for supplying, at least in part, the first DC voltage;
   at least one multimedia over coax alliance (MoCA) ports for supplying, at least in part, the second DC voltage;
   an outdoor satellite antenna incorporating an IPRadio; and
   an interfacility link (IFL) cable having a first end connected to one of the at least one MoCA ports and a second end connected to the IPRadio,
   wherein the IFL cable supplies the second DC voltage to the IPRadio and supplies data to/from the IPRadio, and
   wherein the first DC voltage is lower than the second DC voltage.

2. The apparatus of claim 1, wherein:
   the first DC voltage ranges from 5V-12V; and
   the second DC voltage ranges from 24V-48V.

3. The apparatus of claim 1, further comprising:
   a network device configured for establishing wireless communication links with user equipment and managing access to one or more networks by the user equipment via the wireless communication links; and
   an ethernet cable having a first end connected to the one or more ethernet ports and a second end connected to the network device,
   wherein the ethernet cable supplies the first DC voltage to the network device using a power over ethernet (PoE) standard, and
   wherein the ethernet cable supplies data to/from the network device.

4. The apparatus of claim 3, wherein the first DC voltage is supplied in accordance with one of Type 1, Type 2, Type 3, and Type 4 PoE standard.

5. A system comprising:
   a satellite terminal configured, at least in part, to facilitate communication by one or more user equipment via a satellite, the satellite terminal comprising:
      an indoor unit positioned at an indoor location, and
      a satellite antenna unit positioned at an outdoor location, the satellite antenna unit incorporating an IPRadio;
   a power supply unit disposed within the indoor unit, the power supply unit comprising:
      an input port for receiving an input voltage from an external source,
      a first converter for converting the input voltage to a first DC voltage, and
      a second converter for converting the input voltage to a second DC voltage;
   at least one ethernet port disposed in the indoor unit for supplying, at least in part, the first DC voltage to an indoor source;
   one or more multimedia over coax alliance (MoCA) ports disposed in the indoor unit for supplying, at least in part, the second DC voltage to the satellite antenna unit; and an interfacility link (IFL) cable for connecting the indoor unit to the satellite antenna unit via one of the one or more MoCA ports, wherein the IFL cable supplies the second DC voltage to the IPRadio and supplies data to/from the IPRadio, and wherein the at least one ethernet port and the one or more MoCA ports are accessible from a panel of the indoor unit.

6. The system of claim 5, wherein the first DC voltage is lower than the second DC voltage.

7. The system of claim 6, wherein:
the first DC voltage ranges from 5V-12V; and
the second DC voltage ranges from 24V-48V.

8. The system of claim 5, further comprising:
one or more network devices configured provide a wired and/or wireless communication link between the one or more user equipment and the indoor unit; and
an ethernet cable for connecting each of the one or more network devices to one of the at least one ethernet port of the indoor unit,
wherein the ethernet cable supplies the first DC voltage to the one or more network devices using a PoE standard, and
wherein the ethernet cable supplies data between the one or more network devices and the indoor unit.

9. The system of claim 8, wherein the second DC voltage is supplied in accordance with Type 1, Type 2, Type 3, or Type 4 PoE standard.

* * * * *